US008044146B1

(12) United States Patent
Zou et al.

(10) Patent No.: US 8,044,146 B1
(45) Date of Patent: *Oct. 25, 2011

(54) COMBINATION OF MAIN-CHAIN AND SIDE-CHAIN SULFONATION OF PFCB-6F HIGH-TEMPERATURE FUEL CELL MEMBRANES

(75) Inventors: Lijun Zou, Rochester, NY (US); Sean M. MacKinnon, Fairport, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/761,498

(22) Filed: Apr. 16, 2010

(51) Int. Cl.
*C08F 114/18* (2006.01)

(52) U.S. Cl. ............... 525/326.2; 526/250; 526/252; 526/253; 526/254

(58) Field of Classification Search ............ 525/326.2; 526/250, 252, 253, 254
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,847,518 B2 | 1/2005 | Fukuda et al. | |
| 6,875,537 B2 | 4/2005 | Tani et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2008/0027152 A1* | 1/2008 | Maier et al. ............ | 521/25 |
| 2009/0278083 A1 | 11/2009 | Fuller et al. | |
| 2009/0278091 A1 | 11/2009 | MacKinnon et al. | |
| 2009/0281245 A1 | 11/2009 | MacKinnon et al. | |
| 2009/0281262 A1 | 11/2009 | MacKinnon et al. | |
| 2009/0281270 A1 | 11/2009 | Fuller et al. | |

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

"Fluorel Technical Data Sheets," MatWeb Material Property Data website, http://www.matweb.com/search/GetMatlsByTradename.aspx?navletter=F&tn=Fluorel%E2%84%A2, (2010).

Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC, (2010). Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

\* cited by examiner

*Primary Examiner* — Bernard Lipman (74) *Attorney, Agent, or Firm* — Brooks Kushman P.C.

(57) ABSTRACT

A polymer useful as an ion conducting membrane for fuel cell applications includes both main chain and side chain protogenic groups. Methods for preparing the polymer include addition of the side chains both before and after addition of the protogenic groups.

24 Claims, 4 Drawing Sheets

COMBINATION OF MAIN-CHAIN AND SIDE-CHAIN SULFONATION OF PFCB-6F HIGH-TEMPERATURE FUEL CELL MEMBRANES

BACKGROUND OF THE INVENTION

1. Field of the Invention

The present invention relates to ion conductive polymers, fuel cell membranes and membrane electrode assemblies.

2. Background Art

Fuel cells are used as an electrical power source in many applications.

In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles) supported on carbon particles, to promote oxidation of hydrogen at the anode and reduction of oxygen at the cathode. Protons flow from the anode through the ion conductive polymer membrane to the cathode where they combine with oxygen to form water which is discharged from the cell. Typically, the ion conductive polymer membrane includes a perfluorinated sulfonic acid (PFSA) ionomer.

The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Proton conductive polymer membranes are an important component in a fuel cell device. To achieve optimal fuel cell performance, the proton conductive polymer membrane must maintain a high ionic conductivity and mechanical stability at high and low relative humidity. Aromatic perfluorocyclobutane random copolymers have been disclosed in U.S. Pat. No. 6,559,237 as improved membrane materials for fuel cells. Due to the chain configuration of random copolymers, however, water swelling at high humidity and membrane shrinking at low humidity are common problems with random copolymers. A random copolymer membrane lacks the mechanical robustness to withstand the rigors of hydration and dehydration within an operating fuel cell.

Accordingly, there is a need to provide a further improved proton conductive polymer membrane that maintains robust mechanical properties and high ionic conductivity at a wide range of humidity conditions.

SUMMARY OF THE INVENTION

The present invention solves one or more problems of the prior art by providing in at least one embodiment a polymer that is useful for forming the ion conducting membrane used in fuel cells. The polymer of this embodiment is described by formula 1:

wherein:

$Z_1$, $Z_2$, and $Z_3$ are each independently —$SO_2X$, —$PO_3H_2$, or —COX;

d is the number of $Z_2$ attached to $E_1$;

f is the number of $Z_3$ attached to $E_2$;

$E_1$ and $E_2$ are each independently an aromatic-containing moiety;

A is absent or O or a chain extender having a carbon backbone;

X is an —OH, a halogen, an ester, or $P_1$, $P_2$, $P_3$, $P_4$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

i and j are each independently an integer from 1 to 10,000; and $Q_1$ and $Q_2$ are each independently a fluorinated cyclobutyl moiety.

It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," "block", "random," "segmented block," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The following description of the embodiment(s) is merely exemplary in nature and is in no way intended to limit the invention, its application, or uses.

The term "block" as used herein means a portion of a macromolecule, comprising many constitutional units, that has at least one feature that is not present in adjacent portions.

The term "block macromolecule" as used herein means a macromolecule that is composed of blocks in linear sequence.

The term "block polymer" as used herein means a substance composed of block macromolecules.

The term "block copolymer" as used herein means a polymer in which adjacent blocks are constitutionally different, i.e., each of these blocks comprises constitutional units derived from different characteristic species of monomer or with different composition or sequence distribution of constitutional units.

The term "random copolymer" as used herein means a copolymer consisting of macromolecules in which the probability of finding a given repeating unit at any given site in the chain is independent of the nature of the adjacent units.

Figure 1:
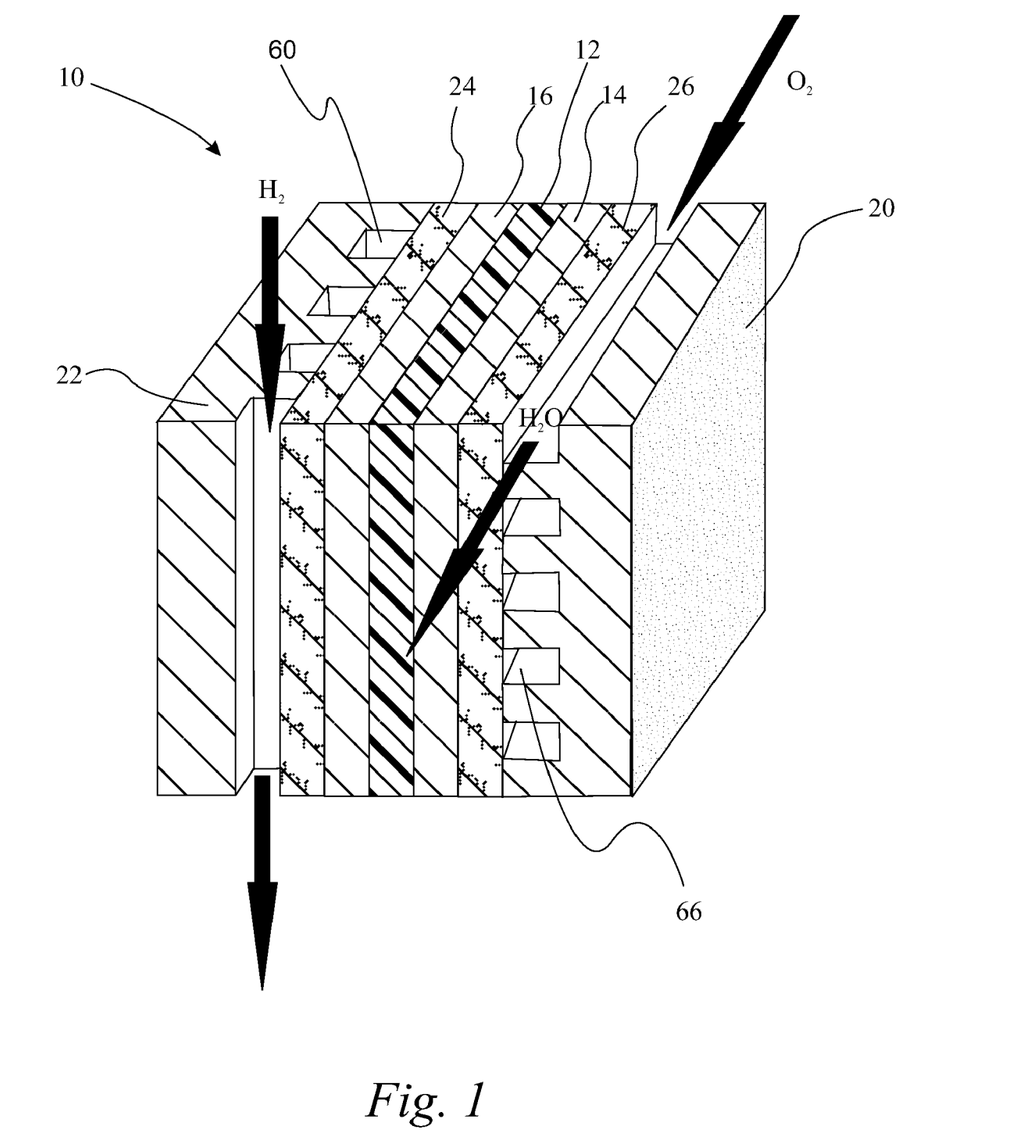
FIG. 1 provides a schematic illustration of a fuel cell incorporating the polymers of an embodiment of the present invention.

With reference to FIG. 1, a fuel cell that incorporates a polymer electrolyte including polymers from the invention is provided. PEM fuel cell 10 includes polymeric ion conductive membrane 12 disposed between cathode catalyst layer 14 and anode catalyst layer 16. Polymeric ion conductive composite membrane 12 includes one or more of the polymers set forth below. Fuel cell 10 also includes conductive plates 20, 22, gas channels 60 and 66, and gas diffusion layers 24 and 26. Advantageously, the present invention provides embodiments for membrane 12.

In an embodiment of the present invention, a polymer that is useful for forming the ion conducting membrane used in fuel cells is provided. The polymer of this embodiment is described by formula 1:

wherein:

$Z_1$, $Z_2$, and $Z_3$ are each independently $-SO_2X$, $-PO_3H_2$, or $-COX$;

d is the number of $Z_2$ attached to $E_1$. In one refinement, d is equal to the number of aromatic rings in $E_1$. In another refinement, d is equal to a 0, 1, 2, 3, or 4;

f is the number of $Z_3$ attached to $E_2$. In one refinement, f is equal to the number of aromatic rings in $E_2$. In another refinement, f is equal to a 0, 1, 2, 3, or 4;

$E_1$ and $E_2$ are each independently an aromatic-containing moiety;

A is absent or O or a chain extender having a carbon backbone;

X is an —OH, a halogen, an ester, or $P_1$, $P_2$, $P_3$, $P_4$ are each independently absent, —O—, —S—, —SO—, —SO$_2$—, —CO—, —NH—, NR$_2$—, or —R$_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

i and j are each independently an integer from 1 to 10,000; and $Q_1$ and $Q_2$ are each independently a fluorinated cyclobutyl moiety.

In a variation of the present embodiment, A is an aromatic-containing moiety, an aliphatic-containing moiety, a polyether, a fluorinated polyether, and combinations thereof. In one refinement of the present embodiment, -ACF$_2$CF$_2$—X comprises a moiety having the following formula:

a, b, c, p are independently an integer from 1 to 10. In a refinement, p is 1, a is 0, b is 0, and c is 2. In another refinement, p is 0, a is 0, b is 0 and c is 2. In another refinement, p is 1, a is 1, b is 0, and c is 2. In still another refinement, p is 1, a is 1, b is 0, and c is 2. In still another other refinement, p is 1, a is 0, b is 2, and c is 2. In yet another refinement, p is 0, a is 0, b is 0 and c is 1. In a variation, -ACF$_2$CF$_2$—X comprises:

Examples for $Q_1$ and $Q_2$ in the above formulae are:

In another embodiment of the present invention, polymeric ion conductive membrane 12 includes a polymer blend. The polymer blend of this embodiment includes a first polymer and a second polymer. The first polymer includes the polymer having formula 1 set forth above. The first polymer is different than the second polymer. In one variation, the second polymer is a non-ionic polymer. In a refinement, the non-ionic polymer is a fluorine-containing polymer such as a fluoro-elastomer or fluoro-rubber. The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution. Examples of fluoro-elastomers include poly(tetrafluoroethlyene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis® under the trade name Technoflon®, from 3M under the trade name Dyneon®, and from DuPont under the trade name Viton®. For example, Kynar Flex® 2751 is a useful copolymer of vinylidene fluoride and hexafluoropropylene with a melting temperature between about 130° C. and 140° C. The glass transition temperature of Kynar Flex® 2751 is about −40 to −44° C. The fluoro-elastomer may further comprise a curing agent to allow crosslinking reaction after blending with a first polymer that includes a perfluorocyclobutyl moiety.

In another variation of this embodiment, the second polymer is a perfluorosulfonic acid polymer (PFSA). In a refinement, such PFSAs are a copolymer containing a polymerization unit based on a perfluorovinyl compound represented by:

where m represents an integer of from 0 to 3, q represents an integer of from 1 to 12, r represents 0 or 1, and $X^1$ represents a fluorine atom or a trifluoromethyl group) and a polymerization unit based on tetrafluoroethylene.

In a variation of this embodiment, the second polymer is present in an amount from about 5 to about 70 weight percent of the total weight of the polymer blend. In a further refinement, the second polymer is present in an amount from about 10 to about 60 weight percent of the total weight of the polymer blend. In still another refinement, the polymer having formula 1 (i.e., the first polymer) is present in an amount from about 30 to about 95 weight percent of the total weight of the polymer blend. In still another refinement, the polymer having formula 1 is present in an amount from about 40 to about 90 weight percent of the total weight of the polymer blend.

In each of the formulae set forth above, $E_1$ and $E_2$ include one or more aromatic rings. For example, $E_1$ and $E_2$, include one or more of the following moieties:

In a variation of the present embodiment, polymer units 3 and 4 in formula 1 are connected together via a linking group $L_1$. Examples of $L_1$ include the following linking groups:

where $R_5$ is an organic group, such as an alkyl or acyl group.

Figure 2:
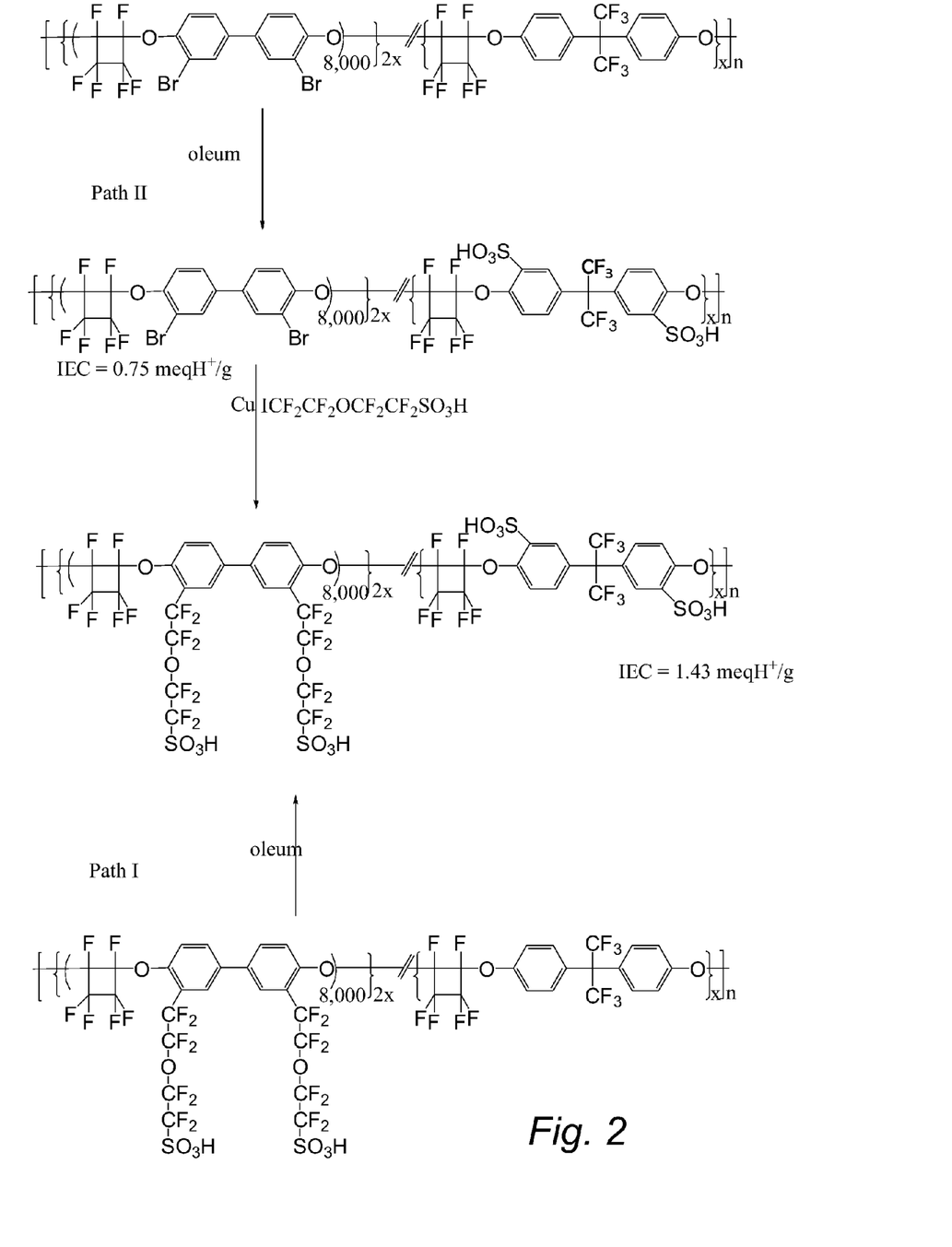
FIG. 2 provides schema for preparing polymers of variations of the invention.

In another embodiment of the present invention, a method for making the compound having formula 1 set forth above is provided. FIG. 2 provides reaction schema of this embodiment. In one variation, a compound having formula 2 is reacted with a compound having formula 3 to form a compound having formula 4 (coupling reaction):

(4)

In a subsequent step, protogenic groups are added to moiety $E_1$ and/or moiety $E_2$ to form the compound having formula 1. In one variation, the compound having formula 4 is treated with a sulfonating agent. Examples of sulfonating agents include, but are not limited to, chlorosulfonic acid, oleum, $SO_2$, or combinations thereof. FIG. 2 provides a specific example of this reaction scheme, labeled as path I.

In another variation of this embodiment, a method for making the compound having formula 1 set forth above is provided. The method of this variation includes a step in which at least one protogenic group is added to moiety $E_1$ and or moiety $E_2$ in a compound having formula 2 to form the compound having formula 5:

(2)

(5)

In one variation, the compound having formula 2 is treated with a sulfonating agent. Examples of sulfonating agents include, but are not limited to, chlorosulfonic acid, oleum, $SO_2$, or combinations thereof. In a subsequent step, the compound having formula 5 is reacted with a compound having formula 3 to form the compound having formula 1 (coupling reaction):

(3)

FIG. 2 provides a specific example of this reaction scheme, labeled as path II.

The methods set forth above each include a step in which a coupling reaction is utilized. In one variation, the coupling step utilizes a variation of the Ullmann reaction. In this variation, group $X_2$ is a halogen. The coupling occurs via the reaction set forth below:

(2)

In another embodiment, a method for making the polymers including the polymer segment of formula 1 is provided. In accordance with the method of this embodiment, groups with at least one hydroxyl that may be functionalized are set forth below:

Specific examples of this coupling are set forth below:

The following examples illustrate the various embodiments of the present invention. Those skilled in the art will recognize many variations that are within the spirit of the present invention and scope of the claims.

Preparation of PFCB-PFSA Side Chain Polymer (TRJ3058-3.5Br-PFSA. Typical Procedure for the Bromination of PFCB Polymers.

A magnetic stir bar and then the PFCB polymer, perfluorocyclobutyl polymer (90,000 Mw) polymerized from a 16,000 Mw biphenyl perfluorocyclobutane oligomer and a hexafluoroisopropylidene-bis-trifluorovinyl ether monomer (5 grams) are added to a screw-cap jar with a Teflon®-lined lid. Methylene chloride (100 mL) is added and the polymer rapidly dissolved with stirring within 1 hour. After 19 hours, iron powder (Sigma-Aldrich catalog number 267953, consisting of particle sizes of less than 10-micrometers, 0.27 g) is added, and the stirring speed is adjusted and maintained to keep the iron powder dispersed throughout the liquid. When the appropriate stirring speed is achieved, the mixture appears gray. Bromine (between 3.4 and 5 g, accurately weighed by difference) is added, and the reaction mixture is stirred for 19 hours at 23° C. Sodium bisulfate (10 g) in water (90 g) is then added and the mixture turns from a yellow-red-brown color to white. The mixture is transferred to a separatory funnel and the aqueous layer is removed and discarded. The methylene chloride layer is washed with four 100-mL portions of water and the methylene chloride layer is then pressure filtered through a 5-micron, Mitex® filter (Millipore). The methylene chloride layer is added portion-wise to methanol (2 L) using a Waring blender, and the coagulated polymer is isolated by filtration. The white, flocculated polymer is washed with three 1-L portions of distilled water. Water washings are continued until the water filtrate no longer appears cloudy. The polymer is then washed with methanol (2 L), and after drying under vacuum at 60° C., the polymer is then suitable to be used directly in the Ullmann coupling reaction, described below. The polymer can be further purified by re-dissolving in methylene chloride at 10 wt. % solids, coagulation with methanol (2 L), isolation by filtration, and then vacuum drying at 60° C. The bromination reaction is carried out with 6F-homopolymer, BPVE homopolymer, and three different block polymers of 8,000-molecular weight BPVE oligomer co-polymerized with 6F monomer. The samples are subjected to elemental analysis to determine elemental composition, especially for % Br. When 3.5, 4 or 5 g of $Br_2$ to 5 grams of polymer is used, the % bromine in the resultant polymer is 24.14, 27.16 or 31.65, respectively. Four bromines per repeat unit on BPVE homopolymer (6 g $Br_2$/5 g TRJ 248 polymer) are obtained, and between 15.23 and 20.20% bromine atoms are obtained when 3 grams of bromine are allowed to react with BPVE homopolymer (TRJ248, 5 g) by following the procedure above. When 6F-homopolymer is used with 3 grams of bromine, the amount of Br on the 6F-homopolymer is 1.53% Br.

Preparation of Potassium Tetrafluoro-2-(tetrafluoro-2-iodoethoxy)ethanesulfonate.

Tetrafluoro-2-(tetrafluoro-2-iodoethoxy)ethanesulfonyl fluoride (Magical Scientific, Oklahoma City) is hydrolyzed to potassium tetrafluoro-2-(tetrafluoro-2-iodoethoxy)ethanesulfonate as follows. To a 500-mL, Teflon®-lined screw cap jar with a magnetic stir bar is added tetrafluoro-2-(tetrafluoro-2-iodoethoxy)ethanesulfonyl fluoride (250.01 g), de-ionized water (82.42 g), methylene chloride (83 mL), distilled 2,6-lutidine (79.97 g), and 1-molar tetrabutylammonium fluoride (1.87 g). The mixture is magnetically stirred for four days, and then the aqueous layer is removed using a separatory funnel. The aqueous layer is extracted three times with methylene chloride (100-mL each time). The methylene chloride layers are combined in a 1-L, round-bottom flask and the volatiles are distilled off under vacuum with gentle heating (less than 50° C.). Tetrahydrofuran (500 mL) is added to the residue and anhydrous potassium carbonate (46.97 g, ground-up with a mortar and pestle) is added. The reaction mixture is magnetically stirred under argon for 10 hours at 23° C., and gas evolution is evident. The reaction mixture is pressure filtered through a 5-micrometer Mitex® into a 1-L pear shaped flask and the solvent is removed under vacuum with gentle heating (less than 50° C.). The residue in 300-mL of a 1:1 mixture of tetrahydrofuran and toluene is heated with magnetic stirring on a hot plate until a solution forms. On cooling, crystals form which are isolated by vacuum filtration and dried. A white soap-like solid is obtained and identified as crop 1 and is dried at 60° C. for 16 hours. Under vacuum, more crystals form in the filtrate, which are vacuum-filtered and identified as crop 2. Upon further evaporation of the filtrate under vacuum, more crystals form which are filtered. This third crop of off-white crystals is combined with the crop 2 crystals and then after another re-rystallization from a 1:1 mixture of toluene and tetrahydrofuran, a white soap-like solid is obtained. After drying at 60° C. overnight in a forced air oven, the white solid is used for the Ullmann coupling reaction.

Ullmann Coupling Reaction of Potassium Tetrafluoro-2-(tetrafluoro-2-iodoethoxy)ethanesulfonate with Brominated, PFCB-Polymers.

All reagents are dried under vacuum at 60° C. before use. To a 3-neck, 500-mL flask, equipped with a reflux condenser, argon inlet, and mechanical stirrer and situated in an oil bath, is added brominated PFCB polymer (10 g, 21.1 wt. % bromine, made by adding 8.0 g of $Br_2$ to 10 g TRJ3059, PFCB-polymer, as described above), dimethyl sulfoxide (20 mL, stored over 4 Å-molecular sieves), and N,N-dimethyl formamide (80 mL, stored over 4 Å-molecular sieves). The mixture is heated in an oil bath set at 130° C., and the polymer starts to dissolve rapidly between 80 and 95° C. While the stirred solution is being heated in the oil bath at 130° C. under argon, copper powder (15.47 g, 45-micrometer particles, Acros 196575000) is rapidly added and the mixture is stirred for 2 hours. Potassium tetrafluoro-2-(tetrafluoro-2-iodoethoxy)ethanesulfonate (27.73 g) dissolved in N,N-dimethyl formamide (100 mL) is then added drop-wise (at a rate of one drop every 3 to six seconds). Stirring under argon in the 130° C. oil bath is continued for 18 hours. The mixture is allowed to settle at 23° C., and the solvent layer is pressure-filtered through a 5-micrometer Mitex® filter. The filtrate is added to 1 liter of 10% hydrochloric acid (prepared by adding 100-mL of concentrated HCl to 900-mL, deioinzed water) using a Waring blender. The mixture is stirred 16 hours at 23° C., and then the polymer is collected by filtration, washed extensively with water (3 liters) using a Waring blender, filtered and dried in vacuo. The yield is 14.23 g. The copper residue remaining in the flask after added washings with N,N-dimethylacetamide is found to contain an additional 0.5 g of polymer. The polymer is dissolved in alcohols (ethanol, methanol, or isopropanol) and N,N-dimethyl acetamide. The polymer has a 10 wt. % solution (usually in N,N-dimethyl acetamide) that is solution coated onto window-pane glass using a Bird applicator bar (with a 10-mil coating gap) and is then dried at 80° C. for 15 minutes. The film is floated off the glass with de-ionized water and is then boiled in 2-molar sulfuric acid for 1 hour. After extensive washing with de-ionized water (until the water washings are neutral), the film is air-dried and used as a polyelectrolyte membrane in a fuel cell. The membrane is further characterized as follows. Before titration, a sample of the membrane is heated using a hair-dryer for 70 seconds in a heated air stream at between 23 and 100° C. An accurately-weighed sample of membrane (usually punched out as a 4.5 cm×0.9 cm×0.0020 cm piece and weighing 0.0120 g) is placed in 50-mL water containing 1.0 g of sodium chloride and is titrated to pH 7 with standardized, 0.0100-molar sodium hydroxide. Another similar sample is boiled in water (100-mL) for 1 hour and the water uptake and volume swell are determined. A similar sample is placed in a Bektek, 4-point conductivity cell and proton conductivity is measured with percent relative humidity (between 20 and 100%) at 80° C. A dried sample, prepared the same as that used for titration, is subjected to EDX analysis to determine elemental composition. The samples prepared as described had an ion exchange capacity of 1.31 milliequivalents of $H^+$ per gram, a water uptake of 645.5 wt. % (995.3 vol. %), and an elemental composition (by EDX or elemental analysis) of 44.11% C, 13.31% O, 33.07% F, 1.24% Br, and 5.27% S. The proton conductivity (S/cm) versus percent relative humidity (in parentheses) at 80° C. is as follows: 0.005672 (20%), 0.01528 (30%), 0.03004 (40%), 0.04918 (50%), 0.07570 (60%), 0.1122 (70%), 0.1612 (80%), 0.2373 (90%), and 0.3187 S/cm (100%). When more than 30 wt. % bromine is attached to the PFCB polymer, cross-linking during the Ullmann, coupling occurred.

Blends of Sulfonated-PFCB Polymers with Kynar Rubber.

A 30 wt. % Kynar® blend is made as follows: A 10 wt. % solution of sulfonated polymer is made by dissolving 1 gram of polymer in 9 grams of N,N-dimethyl acetamide. To this is added 2.857 grams of a 15 wt. % solution of Kynar® 2751 in N,N-dimethyl acetamide. The mixture is vigorously stirred and roll-milled for 1 hour before being pressure filtered through a 5 micrometer, Mitex® filter. The filtrate is placed in a centrifuge at 1000 rpms for ten minutes to remove air bubbles and then the solution is coated onto window pane glass using a Bird applicator bar with an 8-mil coating gap. The film is dried for 15 minutes at 80° C. and is then floated off the glass with de-ionized water. The 16-micrometer thick membrane is boiled for 1 hour in 2-molar sulfuric acid and then is extensively washed with water until the washings are neutral. The resulting membrane is evaluated as described above, except EDX is not routinely carried out on the Kynar® blended samples. The membrane is also subjected to a relative humidity cycling test between 0 and 150% relative humidity over 4 second intervals until either 20,000 cycles are achieved or until a leak of 10 standard cubic centimeters at 10 psi is detected (which constitutes a test failure). A 40 wt. % Kynar® blend is made by adding 4.444 grams of a 15 wt. % Kynar® 2751 solution in N,N-dimethyl acetamide to 10 grams of a 10 wt. % solution of the sulfonated-PFCB polymer in N,N-dimethyl acetamide. The membrane is made as previously described.

Sulfonation of a PFCB-PFSA Side Chain Polymer with Chlorosulfonic Acid.

Figure 3:
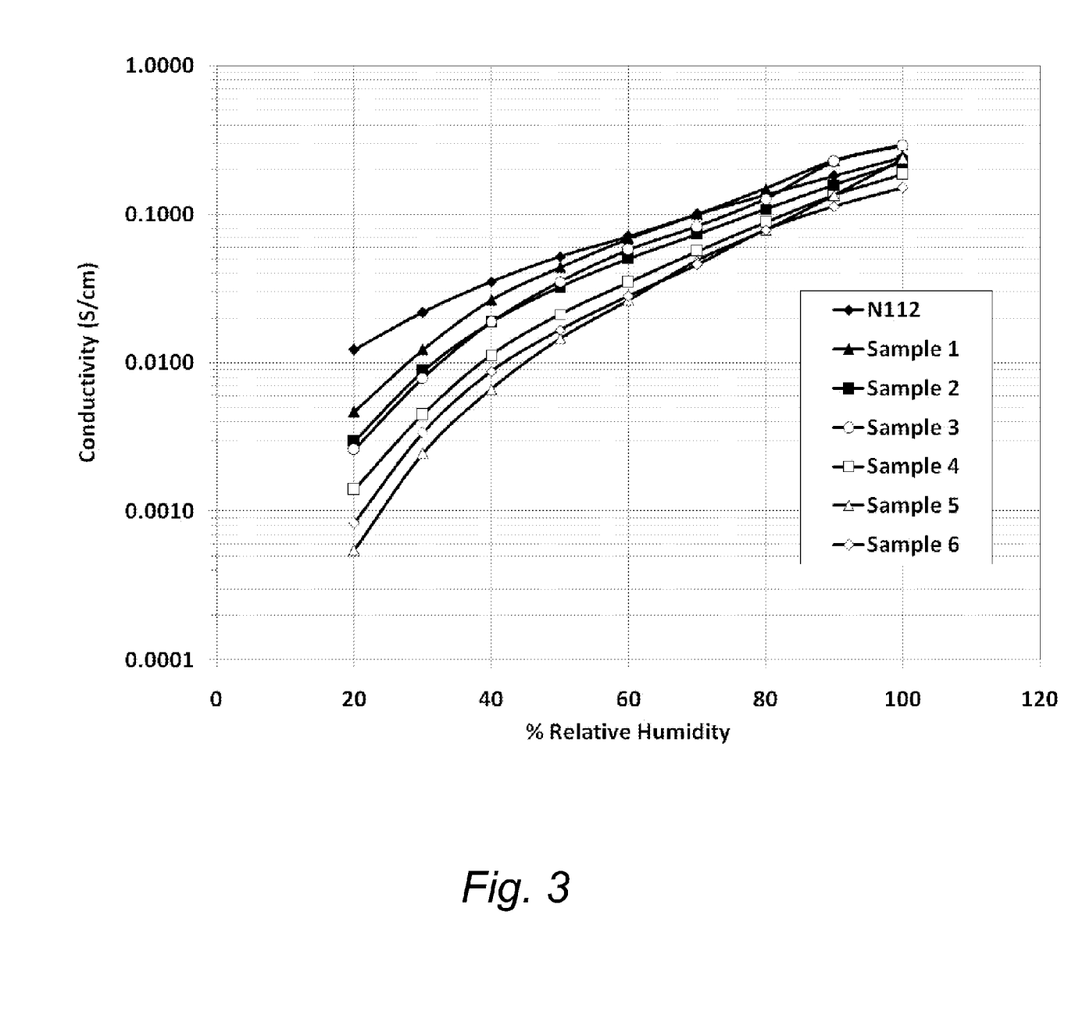
FIG. 3 provides plots of conductivity versus present relative humidity of polymers before and after oleum and chlorosulfonic acid (CSA) treatment.
Figure 4:
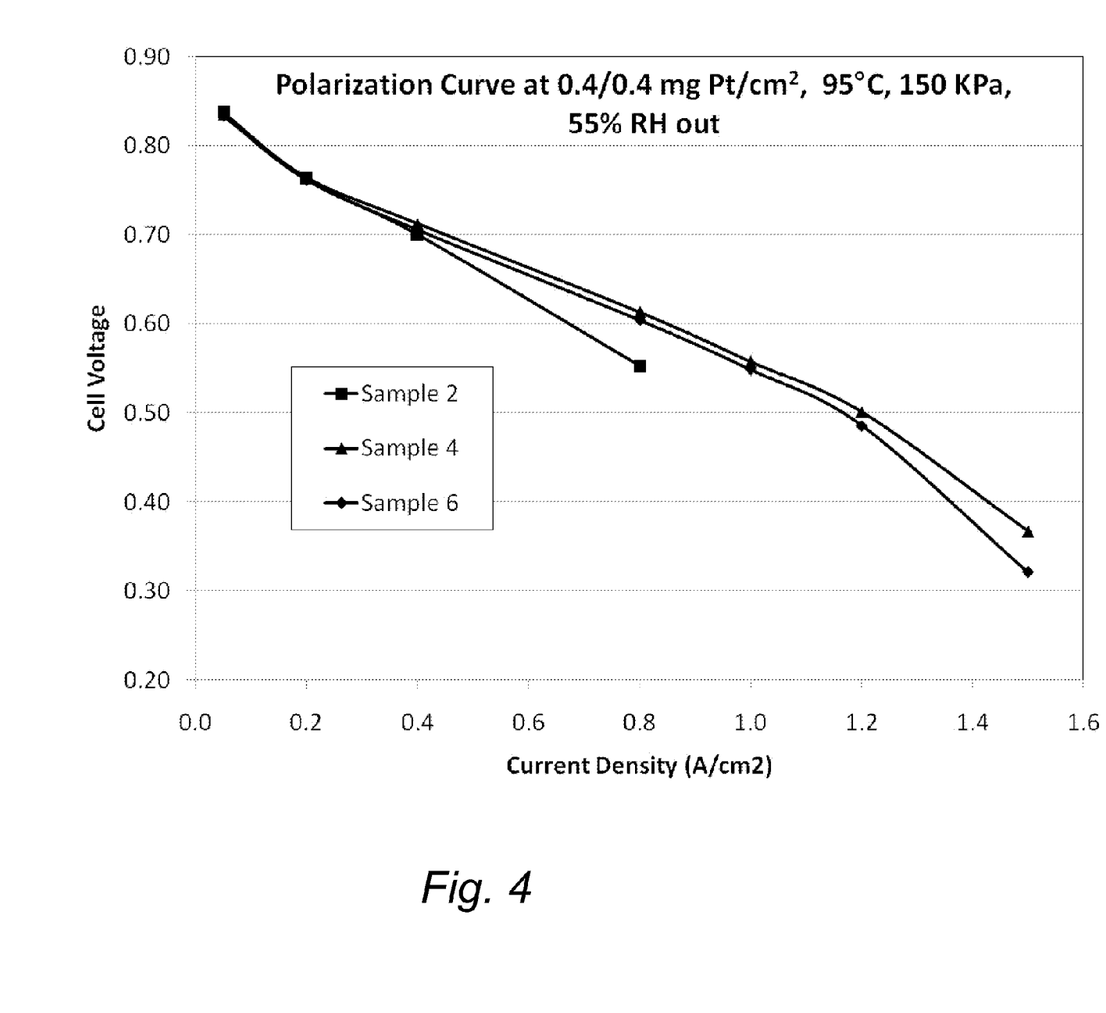
FIG. 4 provides plots of cell voltage versus current density at 55% Relative Humidity Gas Outlet Streams for polymers made by variations of the invention.

To a 50-mL screw-cap jar is added a film of a long-side chain PFCB-PFSA ionomer [TRJ3058-3.5Br-PFSA with an ion exchange capacity (I.E.C.) of 1.30 meq. $H^+$/g, 1.561 g)], methylene chloride (31.22 mL), and chlorosulfonic acid (6.059 g). The lid is secured and placed on a roll mill for 75 minutes. The liquid is decanted off and the film is boiled in water (1 L) for 1 hour, filtered, and dried to yield 1.53 g of powder. The polymer in N,N-dimethylacetamide (DMAc) at 10 wt. % solids is coated on glass using a Bird applicator bar with a 9-mil coating gap and heated at 80° C. until dry. The film is floated off with water and air-dried and pieces of the film are further evaluated by measurement of proton conductivity (with a 4-point probe, Bektek), titration (to give an I.E.C. of 1.62 meq. $H^+$/g), and boiling water uptake (the weight gain is 612 wt. %). Part of the remaining film (0.5 g) is dissolved at 10 wt. % solids in DMAc [i.e., the polymer (0.5 g) diluted to 5 grams with DMAc] and then a solution of Kynar® 2751 (Arkema) at 15 wt. % solids (1.4287 g) is added and vigorously stirred. This solution is pressure filtered through a 5-micrometer Millipore Mitex® filter, centrifuged to remove air bubbles, and then coated on glass using a Bird applicator bar with a 9-mil coating gap followed by heating at 80° C. until dry. The film that consisted of a blend of 70% ionomer and 30% Kynar 2751 is floated off the glass with water and air-dried. The resultant film is used as a polyelectrolyte membrane in a hydrogen-air fuel cell operated under dry conditions (55% relative humidity gas outlet streams) and is further evaluated by measuring proton conductivity and boiling water uptake. The results are shown in FIGS. 3 and 4. The membrane formed with 30 wt. % KF2751 in DMAc had a boiling water uptake of 192.7 wt. % and between 105.8 and 240 vol. %. The polyelectrolyte membrane (PEM) made with the chlorosulfonic acid treated polymer operated at higher cell voltages and current densities out to 1.5 A/cm² as compared to that of the PEM made with the untreated material.

Sulfonation of a PFCB-PFSA Side Chain Polymer with Oleum.

To a 50-mL screw-cap jar is added a membrane (TRJ3058-3.5Br-PFSA, I.E.C. 1.30 meq. $H^+$/g, 1.512 g), methylene chloride (50 mL), and 30 wt. % oleum (2.18 g). The lid is secured and placed on a roll mill for 70 minutes. The polymer is added to water (1 L), filtered, and dried powder (1.431 g). The polymer in N,N-dimethylacetamide at 10 wt. % solids is coated on glass using Bird applicator bar with a 9-mil coating gap and heated at 80° C. until dry. The film is floated off with water and air-dried and pieces of the film are further evaluated by measuring proton conductivity, titration (to give an I.E.C. of 1.42 meq. $H^+$/g), and boiling water uptake (the weight gain is 297 wt. %). Part of the remaining film is divided in two 0.5 gram parts. One 0.5-g portion is dissolved at 10 wt. % solids in DMAc [i.e., the polymer (0.5 g) diluted to 5 grams with DMAc] and then a solution of Kynar® 2751 (Arkema) at 15 wt. % solids (2.222 g) is added and vigorously stirred. This solution is pressure filtered through a 5-micrometer Millipore Mitex® filter, centrifuged to remove air bubbles, and then coated on glass using a Bird applicator bar with a 9-mil coating gap followed by heating at 80° C. until dry. The film consisting of 60% ionomer and 40% Kynar® 2751 is floated off with water and air-dried. A second solution is made consisting of 0.5-g of the ionomer powder in DMAc (5 grams), and then a solution of Kynar® 2751 (Arkema) at 15 wt. % solids (1.4287 g) is added and vigorously stirred. This solution is pressure filtered through a 5-micrometer Millipore Mitex® filter, centrifuged to remove air bubbles, and then coated on glass using a Bird applicator bar with a 9-mil coating gap followed by heating at 80° C. until dry. The film consisting of 70% ionomer and 30% Kynar® 2751 is floated off with water and air-dried. The resultant films are used as a polyelectrolyte membrane in a hydrogen-air fuel cell. The results are shown in FIG. 3. The membrane formed with 30 wt. % KF2751 in DMAc had a boiling water uptake of 222.8 wt. % and 257.8 vol. %.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A polymer having formula 1:

wherein:

$Z_1$, $Z_2$, and $Z_3$ are each independently —$SO_2X$, —$PO_3H_2$, or —COX;

d is the number of $Z_2$ attached to $E_1$;

f is the number of $Z_3$ attached to $E_2$;

$E_1$ and $E_2$ are each independently an aromatic-containing moiety;

A is absent or O or a chain extender having a carbon backbone;

X is an —OH, a halogen, an ester, or $P_1$, $P_2$, $P_3$, $P_4$ are each independently absent, —O—, —S—, —SO—, —$SO_2$—, —CO—, —NH—, —$NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

i and j are each independently an integer from 1 to 10,000; and $Q_1$ and $Q_2$ are each independently a fluorinated cyclobutyl moiety.

2. The polymer of claim 1 wherein $E_1$ and $E_2$ each independently comprise a component selected from the group consisting of:

3. The polymer of claim 1 wherein $Q_1$ and $Q_2$ are each independently selected from the group consisting of:

4. The polymer of claim 1 wherein A is an aromatic-containing moiety, an aliphatic-containing moiety, an ether, or a fluorinated polyether.

5. The polymer of claim 1 wherein $-ACF_2CF_2—Z_1$ comprises a moiety having the following formula:

wherein:
a, b, c, p are independently an integer from 1 to 10.

6. The polymer of claim 1 wherein $-ACF_2CF_2—Z_1$ comprises:

7. A method of making a polymer having formula 1:

wherein:
$Z_1$, $Z_2$, and $Z_3$ are each independently $—SO_2X$, $—PO_3H_2$, or $—COX$;

d is the number of $Z_2$ attached to $E_1$;

f is the number of $Z_3$ attached to $E_2$;

$E_1$ and $E_2$ are each independently an aromatic-containing moiety;

A is absent or O or a chain extender having a carbon backbone;

X is an $—OH$, a halogen, an ester, or $P_1$, $P_2$, $P_3$, $P_4$ are each independently absent, $—O—$, $—S—$, $—SO—$, $—SO_2—$, $—CO—$, $—NH—$, $NR_2—$, or $—R_3—$;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

i and j are each independently an integer from 1 to 10,000; and $Q_1$ and $Q_2$ are each independently a fluorinated cyclobutyl moiety, the method comprising:

a) reacting a compound having formula 2 with a compound having formula 3 for form a compound having formula 4:

b) adding protogenic groups to moiety $E_1$ and/or $E_2$ to form the compound having formula 1.

8. The method of claim 7 wherein in step b) the compound having formula 4 is treated with a sulfonating agent.

9. The method of claim 8 wherein the sulfonating agent is chlorosulfonic acid, oleum, $SO_2$, or combinations thereof.

10. The method of claim 7 wherein A is an aromatic-containing moiety, an aliphatic-containing moiety, an ether, or a fluorinated polyether.

11. The method of claim 7 wherein $-ACF_2CF_2—Z_1$ comprises a moiety having the following formula:

wherein:
a, b, c, p are independently an integer from 1 to 10.

12. The method of claim 7 wherein $-ACF_2CF_2—Z_1$ comprises:

13. A method of making a polymer having formula 1:

1 wherein:

$Z_1$, $Z_2$, and $Z_3$ are each independently —$SO_2X$, —$PO_3H_2$, or —COX;

d is the number of $Z_2$ attached to $E_1$;

f is the number of $Z_3$ attached to $E_2$;

$E_1$ and $E_2$ are each independently an aromatic-containing moiety;

A is absent or O or a chain extender having a carbon backbone;

X is an —OH, a halogen, an ester, or $P_1$, $P_2$, $P_3$, $P_4$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

i and j are each independently an integer from 1 to 10,000; and $Q_1$ and $Q_2$ are each independently a fluorinated cyclobutyl moiety, the method comprising:

a) adding a protogenic group to moiety $E_1$ and/or $E_2$ in a compound having formula 2 to form the compound having formula 5:

2

5 b) reacting the compound having formula 5 with a compound having formula 3 to form the compound having formula 1:

3

14. The method of claim 13 wherein in step a) the compound having formula 2 is treated with a sulfonating agent.

15. The method of claim 14 wherein the sulfonating agent is chlorosulfonic acid, oleum, $SO_2$, or combinations thereof.

16. The method of claim 13 wherein A is an aromatic-containing moiety, an aliphatic-containing moiety, an ether, or a fluorinated polyether.

17. The method of claim 13 wherein -$ACF_2CF_2$—$Z_1$ comprises a moiety having the following formula:

wherein:

a, b, c, p are independently an integer from 1 to 10.

18. The method of claim 13 wherein -$ACF_2CF_2$—$Z_1$ comprises:

19. The polymer of claim 1 wherein d is equal to the number of aromatic rings in $E_1$ and f is equal to the number of aromatic rings in $E_2$.

20. The polymer of claim 1 wherein d is equal to 0, 1, 2, 3, or 4 and f is equal to a 0, 1, 2, 3, or 4.

21. The method of claim 7 wherein d is equal to the number of aromatic rings in $E_1$ and f is equal to the number of aromatic rings in $E_2$.

22. The method of claim 7 wherein d is equal to 0, 1, 2, 3, or 4 and f is equal to a 0, 1, 2, 3, or 4.

23. The method of claim 13 wherein d is equal to the number of aromatic rings in $E_1$ and f is equal to the number of aromatic rings in $E_2$.

24. The method of claim 13 wherein d is equal to 0, 1, 2, 3, or 4 and f is equal to a 0, 1, 2, 3, or 4.

* * * * *